United States Patent

[11] 3,536,130

[72] Inventor Louis H. Leonard, Jr.
Dewitt, New York
[21] Appl. No. 784,617
[22] Filed Dec. 18, 1968
[45] Patented Oct. 27, 1970
[73] Assignee Carrier Corporation
Syracuse, New York
a corporation of Delaware

[54] ABSORPTION HEATING AND COOLING SYSTEM
9 Claims, 1 Drawing Fig.
[52] U.S. Cl. .................................................... 165/2,
62/114
[51] Int. Cl. ..................................................... F25b 29/00
[50] Field of Search ............................................ 62/114,
476, 141; 165/2, 62

[56] References Cited
UNITED STATES PATENTS
3,153,441 10/1964 Pippert et al. ................. 165/62X Primary Examiner—William E. Wayner
Attorneys—Harry G. Martin, Jr. and J. Raymond Curtin ABSTRACT: A heating and cooling system utilizing an absorption refrigeration system including a generator, a condenser, an absorber, and an evaporator, when operating in the cooling mode. Heating passage means is provided for converting the system to a heating mode operation by mixing the absorbent solution and refrigerant to form a heating medium, passing the heating medium through the generator for heating, and passing the heated heating medium through a heat exchanger to provide heat to a desired location. Various liquid-filled vapor traps are established when operating in the heating mode by accumulation of the heating medium. A layer of a suitable additive, preferably having heat transfer promoting properties in the cooling mode, such as 2-ethyl-n-hexanol, is formed over the surface of the heating medium at locations exposed to low ambient temperatures to inhibit evaporation of the heating medium.

Patented Oct. 27, 1970　　　　　　　　　　　　3,536,130
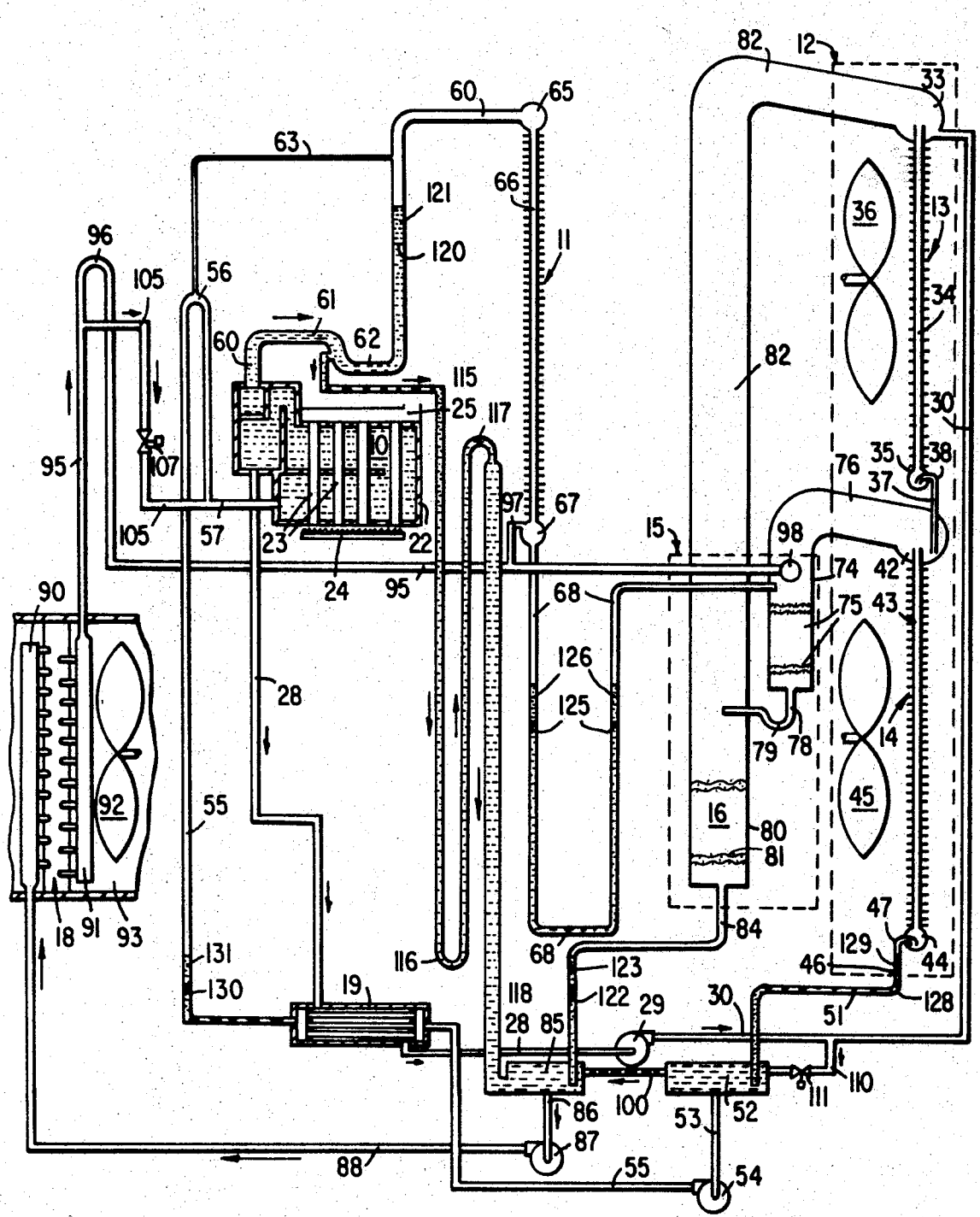
INVENTOR.
LOUIS H. LEONARD, JR.
BY Frank N. Decker Jr.
ATTORNEY.

ABSORPTION HEATING AND COOLING SYSTEM

BACKGROUND OF THE INVENTION

Heating and cooling systems are known which utilize an absorption refrigeration cooling mode of operation and a condensation heating mode of operation. These systems have a number of disadvantages relating to the heating mode condensation process and the possibility of freezing or solidification of the refrigerant and absorbent solution when the system is located in a low ambient temperature environment. These problems are overcome by the heating and cooling system described in my application Ser. No. 784,724, filed Dec. 18, 1968 filed concurrently herewith. The system described in that application employs a heating medium comprising a mixture of absorbent solution and refrigerant having excellent antifreeze properties which is heated in the generator and passed through a suitable heat exchanger to provide heat to a desired location.

When switching a system of the type described from the heating to the cooling mode of operation, it is desirable to form certain liquid-filled vapor traps in the system which are exposed to condenser or absorber temperature. A problem arises if it is desired to heat the liquid heating medium to a temperature corresponding to a vapor pressure which is higher than the vapor pressure existing in the absorber and condenser, because of the tendency of the heating medium to boil. This can be partially overcome by forming certain specially designed traps having a cold leg containing heating medium which remains cool and out of circulation in the system. However, still further protection may be desirable against the possibility of vaporizing or boiling refrigerant from the heating medium during operation at very low ambient condenser and absorber temperatures.

SUMMARY OF THE INVENTION

In accordance with this invention, there is provided a heating and cooling system utilizing an absorption refrigeration cooling mode of operation. Heating passages are provided to switch from cooling to heating operation by mixing absorbent solution and refrigerant to form a heating medium. The heating medium is heated in a generator and circulated through a suitable heat exchanger to provide heat to a desired location from which the heating medium is returned to the generator for reheating. Liquid traps preventing the passage of vapor are formed at certain locations in the system when operating in the heating mode. For example, it is preferred to form a liquid trap in the refrigerant vapor passage between the generator and the condenser when operating in the heating mode.

In order to prevent evaporation of refrigerant or boiling of the liquid heating medium during heating operation, an excess quantity of a suitable additive, which is immiscible with the heating medium and has a lower specific gravity than the heating medium, is introduced into the system and passed to the locations at which the traps are formed. A preferred liquid additive is one such as 2-ethyl-n-hexanol, which also improves heat transfer in the cooling mode of operation. The immiscible liquid additive gravitationally separates from the liquid heating medium and forms a layer on the surface of the liquid heating medium of sufficient thickness to substantially inhibit the diffusion of refrigerant molecules therethrough. Consequently, the heating medium may be safely heated to a temperature corresponding to a vapor pressure, which exceeds the pressure in the condenser and absorber, without resulting in boiling or vaporization of the absorbent from the heating medium.

BRIEF DESCRIPTION OF THE DRAWING

The drawing is a schematic illustration, partly in cross section, of a heating and cooling system in accordance with this invention illustrating certain liquid levels as they are present in the heating mode of operation.

DESCRIPTION OF THE PREFERRED EMBODIMENT

This invention will be described with respect to a preferred embodiment wherein a two-stage adiabatic refrigerant evaporator and a two-stage air-cooled absorber are employed. However, this invention may be employed in systems having any number of either adiabatic or nonadiabatic evaporator stages.

The preferred refrigerant is water and the preferred absorbent is an aqueous solution of lithium bromide, although other absorbent-refrigerant combinations, especially those including a lithium halide salt, may be employed instead. As used herein, a concentrated solution of lithium bromide which is strong in absorbing power will be referred to as "strong" solution and a dilute solution of lithium bromide which is weak in absorbing power will be referred to as "weak" solution. "Refrigerant" as used herein includes pure water, which may be referred to as "concentrated refrigerant", and water having lithium bromide therein, which may be referred to as "dilute refrigerant". An additive, such as 2-ethyl-n-hexanol, is added to the absorbent solution.

Referring to the drawing, the system comprises a generator 10, a condenser 11, an absorber 12 having a low-pressure stage 13 and a high-pressure stage 14, and adiabatic evaporator 15 having a low-temperature stage 16 and a high-temperature stage 17, an air conditioning heat exchanger 18 and a solution heat exchanger 19. Heat exchanger 18 provides sensible heat exchange between cold liquid refrigerant and air being conditioned when the system is connected to provide refrigeration. In such operation, heat exchanger 18 functions as a heat absorbing heat exchanger.

Generator 10 comprises a shell 22 having a plurality of fire tubes 23 extending therethrough. Fuel burner 24 discharges hot gas through fire tubes 23 into flue gas collector 25. Other types of generators, such as those employing steam or hot water as a heating fluid, may be alternatively utilized.

Weak absorbent solution is supplied to generator 10 and boiled therein to concentrate the solution in the cooling mode of operation. The resulting strong absorbent solution passes through strong solution passage 28 and the shell side of solution heat exchanger 19 to strong solution pump 29. The strong solution is pumped through strong solution passage 30 to low-pressure vapor header 33 disposed at the top of low-pressure absorber stage 13.

Low-pressure absorber stage 13 comprises a plurality of vertically disposed finned absorber heat exchange tubes 34 connected at their upper ends by a low-pressure vapor header 33 and at their lower ends by a low-pressure liquid header 35. Strong solution overflows the open upper ends of absorber tubes 34 and passes downwardly along the interior surface of the absorber tubes while absorbing refrigerant vapor therein. The heat of the absorption process is rejected to ambient air passed over the exterior surfaces of absorber tubes 34 by fan 36. The absorbent solution is somewhat diluted by absorption of refrigerant vapor in tubes 34, so that the solution collected in low-pressure liquid header 35 is of intermediate concentration. The intermediate solution passes through siphon tube 37 having an upwardly arched portion 38 into high-pressure vapor header 42 of high-pressure absorber stage 14.

High-pressure absorber stage 14 comprises a plurality of finned vertical absorber heat exchange tubes 43 joined at their upper ends by high-pressure vapor header 42 and at their lower ends by high-pressure liquid header 44. Intermediate absorbent solution overflows the upper open ends of absorber tubes 43 and passes downwardly along the interior surfaces of the absorber tubes while refrigerant vapor is being absorbed therein. The heat of the absorption process is rejected from high-temperature absorber stage 14 to ambient air passed over the exterior surfaces of absorber tubes 43 by fan 45.

Absorbent solution passing downwardly through absorber tubes 43 if further diluted by the absorption of refrigerant vapor therein so that the absorbent solution collected in high-pressure liquid header 44 is weak in absorbing power. The weak solution passes from the low-pressure liquid header 44 through a siphon tube 46 having an upwardly arched portion 47 through weak solution passage 51 into weak solution sump 52. The weak solution then passes from weak solution sump 52 through weak solution passage 53 to weak solution pump 54. The weak solution is then pumped through weak solution passage 55 and the interior tubes of solution heat exchanger 19 through an upwardly extending loop 56, and weak solution passage 57 into generator 10 for reconcentration.

Refrigerant vapor is formed in generator 10 by the boiling of absorbent solution. This refrigerant vapor passes from generator 10 to condenser 11 through refrigerant vapor passage 60. Refrigerant vapor passage 60 has an upwardly extending loop 61 and a downwardly extending loop or trap 62 therein, which are free of liquid in the cooling mode. A vent line 63 vents the upper portion of loop 56 to the condenser pressure in passage 60.

Refrigerant condenser 11 comprises a plurality of vertical finned tubes 66 connected at their upper ends by refrigerant vapor header 65 and at their lower ends by refrigerant condensate header 67. Preferably, condenser 11 is located to receive air passing over the tubes in absorber 12 in order to utilize the absorber fans for passage of cooling air over the condenser. The refrigerant condensate formed in condenser 11 passes from header 67 through condensate passage 68 having a downwardly extending loop or trap 69 into high temperature evaporator stage 17 of adiabatic refrigerant evaporator 15.

High-temperature evaporator stage 17 comprises a shell 74 having packing material 75 therein. A vapor passage 76 extends between high-temperature evaporator stage 17 and vapor header 42 of high-pressure absorber stage 14. A small quantity of refrigerant is evaporated from refrigerant passing through evaporator stage 17, thereby flash-cooling the remaining refrigerant. The cooled refrigerant passes from high-temperature evaporator stage 17 to low-temperature evaporator stage 16 through refrigerant passage 78 having a downwardly extending trap 79.

Low-temperature evaporator stage 16 comprises a shell 80 having packing material 81 therein and a refrigerant vapor passage 82 communicating with vapor header 33 of low-pressure absorber 13. As in the preceding stage, a small quantity of refrigerant is evaporated in low-temperature evaporator stage 16 which results in flash-cooling the remainder of refrigerant passing therethrough. In all, only about 1 percent of the total refrigerant flowing through adiabatic evaporator 15 need be evaporated to satisfactorily flash-cool the remaining 99 percent. A conventional single or multi-stage evaporator having a heat absorbing heat exchanger 18 included therein may be alternatively employed.

The cold refrigerant then passes from low-temperature evaporator stage 16 through refrigerant passage 84 into refrigerant sump 85. The cold refrigerant passes from sump 85 through refrigerant passage 86 to pump 87 and is pumped through passage 88 to inlet header 90 of heat absorbing heat exchanger 18. Heat exchanger 18 may comprise an air conditioning fan-coil unit having an inlet header 90, an outlet header 91 and a fan 92 for passing air to be conditioned through the fan-coil unit located in duct 93. Heat exchanger 18 passes cold liquid refrigerant in heat exchange relation with the air passing thereover to cool the air which constitutes a refrigeration load in the cooling mode of operation. After absorbing heat from the air being cooled, the warmed liquid refrigerant passes through refrigerant passage 95 having an upwardly extending loop 96 and restricted spray nozzle 98 back to high-temperature evaporator stage 17 of adiabatic evaporator 15 for recooling of the refrigerant. Some refrigerant is bled through passage 97 into condensate header 67 to mix refrigerant with the condensate.

A refrigerant reconcentration and vapor pressure control passage 100 extends between sumps 85 and 52 as shown in the drawing. This passage serves to adjust the concentration and vapor pressure of refrigerant and absorbent solution in the system under various operating conditions as explained in Leonard application Ser. No. 784,725, filed Dec. 18, 1968.

A heating passage 105 communicates with passage 95 at a point below the top of upwardly arched loop 96. A mode control valve 107 is disposed in passage 105 which communicates at its other end with generator 10 through passage 57. Another heating passage 110 having a mode control valve 111 therein communicates between discharge of solution passage 30 and absorbent sump 52. A third heating passage 115, which comprises a generator effluent passage, has an upper end connected between upwardly arched portion 61 and downwardly arched portion 62 of passage 60. Effluent passage 115 has a downwardly extending loop 116 and an upwardly extending loop 117 therein. The downward leg 118 of upwardly extending loop 117 is connected to refrigerant sump 85 and is of larger diameter than the legs of loop 116 to prevent siphoning of loop 116.

When the system is in the cooling mode of operation, mode control valves 107 and 111 are closed. Loop 116 is filled with sufficient liquid to balance the pressure difference between generator 10 and refrigerant sump 85 to prevent passage of vapor therebetween. At or above design ambient absorber temperature, the refrigerant circulated through evaporator 15 and heat exchanger 18 is preferably substantially pure water and the strong absorbent solution concentration is preferably about 64.5 percent lithium bromide by weight.

To switch from the cooling mode of operation to the heating mode, control valves 107 and 111 are opened. Operation of pumps 54 and 29, and fans 36 and 45 is discontinued. Opening of valve 107 causes the fluid passing through passage 95 from heat exchanger 18 to be diverted into passage 105 because passage 105 and connecting passage 57 is below the top of loop 96 which is above the top of loop 61. Generator 10 and loops 61 and 62 are flooded with a mixture of refrigerant and absorbent solution by pump 87. The liquid level in passage 60 is below the junction of vent line 63 and below the top of loop 96 as shown in the drawing. All of the refrigerant and absorbent solution in the system is mixed together to form a heating solution when the system is in the heating mode.

A major portion of the heated solution (90 percent) passes upwardly through loop 61 into passage 115. The level of the heated solution is above the level of upwardly extending loop 117 and it will flow by gravity through passage 115 through downwardly extending leg 118 into refrigerant sump 85. The heated solution passes from refrigerant sump 85 through the heat exchanger 18. A minor portion (10 percent) of the solution heated in generator 10 continues to pass downwardly through passage 28, the shell side of heat exchanger 19, through inoperative pump 29, passages 30 and 110, into absorbent sump 52, and through control passage 100 into refrigerant sump 85, from which it passes to heat exchanger 18, as previously described.

When it is desired to terminate heating and return to the cooling mode of operation, mode control valves 107 and 111 are closed. Pumps 54 and 29 and fans 36 and 45 are again energized. Closing of valve 107 terminates direct flow of solution from heat exchanger 18 to generator 10. Instead, solution is pumped from heat exchanger 18, through upwardly extending loop 96 and passage 95, and serially through high temperature evaporator 17 and low temperature evaporator 16 of adiabatic evaporator 15. The solution in generator 10 is heated to the boiling temperature to concentrate the solution. The level of solution in the generator drops so that vapor passage 60 is free of liquid and loop 116 is sealed but no longer passes solution.

The volume of strong absorbent solution passing to sump 52 will decrease as refrigerant is boiled from it in the generator, and the level of solution in sump 52 will tend to drop. Conversely, the quantity of refrigerant passing through evaporator 15 will increase due to the refrigerant added to the refrigerant circuit from condenser 11, and the level of refrigerant in sump 85 will tend to rise. When the head of refrigerant in sump 85 tends to exceed the head of absorbent solution in sump 52, diluted refrigerant will flow through refrigerant reconcentration and vapor pressure control line 100 into absorbent sump 52 to balance the liquid heads in the two sumps. At absorber ambient temperature above design conditions, diluted refrigerant will continue to be bled from sump 85 into sump 52 until the refrigerant has been substantially concentrated and the absorbent solution has been concentrated to the desired full-load design operating concentration.

If the temperature of air passed over absorber 12 is less than the design temperature, the process of concentrating the absorbent solution and the refrigerant will stop at some intermediate concentration where an equilibrium is reached between absorber capacity and refrigeration demand. From then on, the concentration of absorbent and refrigerant will adjust itself to provide a variable pressure effect which just balances refrigeration load against absorber capacity.

Trap 62 is filled with liquid during heating mode of operation by opening of valves 107 and 110. The condenser side leg of solution in trap 62 may have a higher vertical elevation than the generator side leg due to a difference in pressures between the condenser and the generator when the condenser is exposed to relatively low ambient temperatures. It will be noted that the generator effluent passage which includes upwardly arched loop 61 and heating passage 115 is connected to the generator side leg and is remote from trap 62 in the sense that liquid in the condenser side leg of the trap does not circulate through heating passage 115 to any substantial extent. This feature assures a quiet relatively cool leg of solution in the condenser side of the trap which is effective to prevent direct vapor communication between the generator and the condenser.

In accordance with this invention, a layer 121 of a liquid additive is formed on the surface 120 of the heating medium in the condenser side leg of trap 62. Additive 121 may comprise any material having a relatively low volatility, a specific gravity less than that of the heating medium in trap 62, and which is relatively immiscible with the heating medium. Liquid additive 121 is preferably a material through which refrigerant molecules diffuse relatively slowly so that the material will substantially prevent vaporization or boiling of refrigerant from the heating medium in trap 62, even though the temperature of the heating medium may provide a refrigerant vapor pressure higher than the pressure existing in condenser 11. Layer 121 should have a sufficient thickness to effectively reduce the passage of refrigerant therethrough to an extent that the condensation of refrigerant in condenser 11 is of an unsubstantial amount.

Additive 121 is preferably also a material, such as 2-ethyl-n-hexanol, which assists heat transfer when circulated through the absorber in contact with absorbent solution and refrigerant vapor, when the system is operating in the cooling mode. However, various other materials may be used to provide the required vaporization inhibiting function on the heating mode, such as an immiscible, low specific gravity, low vapor pressure silicon oil.

Any convenient means may be employed for passing the liquid additive to the cold leg of trap 62. It is preferred to charge the refrigeration system with an excess quantity of 2-ethyl-n-hexanol over that amount effective to produce increased cooling mode heat transfer and to maintain the additive emulsified with absorbent solution and/or refrigerant by the action of the various pumps in the system. The use of centrifugal liquid pumps is desirable for emulsifying the additive with other system liquids. Upon switching in the system from the cooling mode to the heating mode of operation, the heating medium will contain sufficient emulsified additive so that layer 121 will settle out and overlay surface 120 during operation of the system in the cooling mode.

In addition to liquid-filled vapor trap 62, there are other locations in the system at which it is desirable to provide an additive layer on the surface of the liquid in order to reduce the amount of vaporization which can take place and to prevent freezing of the condensed vapor at locations which might cause injury to the system. For example, trap 68 is filled with refrigerant condensate which may be diluted with absorbent during heating mode operation. It is desirable that a layer of liquid additive 126 be formed so as to overlie the surface 125 of the liquid in trap 68 during heating mode operation. Likewise, there are other locations in the system exposed to low pressure where vapor is prevented from passing which may be broadly referred to as traps, at which liquid levels are formed when the system is in the heating mode. A layer of alcohol 129 is preferably formed on the surface 128 of the liquid in weak solution passage 51. Layer 123 of additive preferably overlies surface 122 of liquid in refrigerant passage 184. Similarly, a layer 131 of additive preferably overlies surface 130 of the liquid in weak solution passage 55 when the system is operating in the heating mode.

The exact thickness of the additive layer may be empirically determined for a given system. It is preferred, however, that the thickness be in excess of about 1 inch or more of additive for a lithium bromide system wherein water is the refrigerant and 2-ethyl-n-hexanol is the additive. This condition requires charging the system with an amount of additive which is substantially in excess of that which would normally be required for cooling operation. For example, the 2-ethyl-n-hexanol in the machine may be on the order of about 10 percent or more of the total liquid in the system. For purposes of this invention, the term "excess additive" means that quantity of additive which is sufficient to form a layer of substantial thickness on the surface of vapor traps or other locations exposed to absorber or condenser pressure during heating mode operation and which is effective to materially inhibit vaporization of refrigerant from the liquid at those locations.

By means of this invention, it is possible to heat the liquid heating medium in the generator to a temperature corresponding to a vapor pressure which is higher than the pressure existing in the condenser and absorber during conditions of low ambient temperature, without the danger of refrigerant vaporizing and condensing at unwanted locations. By inhibiting vaporization of refrigerant, it will be apparent that a potential heat loss from the system is reduced. Even more important, however, is the fact that the temperature of the heating medium may be maintained sufficiently high to provide effective winter heating without vaporizing refrigerant at low ambient condenser temperatures. In addition, the danger of bursting condenser tubes by freezing of water vapor therein is substantially reduced by the practice of this invention because the quantity of water evaporated is reduced.

While a preferred embodiment of this invention has been illustrated and described, it will be appreciated that the invention may be otherwise embodied within the scope of the following claims.

I claim:

1. A heating and cooling system having a cooling mode of operation and a heating mode of operation:

A. said system in the cooling mode of operation comprising a generator for concentrating weak absorbent solution by boiling the weak solution and vaporizing refrigerant therefrom, a condenser for condensing refrigerant vaporized in the generator, an evaporator for evaporating refrigerant condensed in the condenser to provide cooling, and an absorber for absorbing refrigerant vapor formed in the evaporator into absorbent solution concentrated in the generator, said system including refrigerant vapor passage means extending from said generator to said condenser for passing refrigerant vapor from the generator to the condenser for condensation therein;

B. said system in the heating mode of operation comprising heating passage means including generator effluent passage means for passing a heated liquid heating medium from the generator through a heat exchanger in heat exchange relation with a heating load, and passage means for returning the heating medium to the generator for reheating therein;

wherein the improvement comprises:

C. said system in the heating mode of operation having a liquid trap therein, the liquid trap having a liquid in at least one leg thereof exposed to a relatively lower temperature than the liquid in the generator; and D. the liquid in said trap comprising a liquid additive having a lower specific gravity than said liquid heating medium and being relatively immiscible therewith, said liquid additive forming a layer of liquid at the surface of said one leg of the trap which is exposed to said lower temperature, said liquid additive having a lower volatility than said heating medium and being present in a quantity to form a layer of sufficient thickness to inhibit vaporization of liquid heating medium from said one leg of said trap.

2. An absorption refrigeration system as defined in claim 1:

A. said liquid trap being disposed in the refrigerant vapor passage for preventing direct vapor communication between the generator and the condenser when the trap is flooded with liquid during the heating mode of operation of the system, said one leg of said trap being exposed to condenser temperature;

B. passage means for flooding said liquid trap with liquid heating medium during the heating mode of operation of said system; and C. said generator effluent passage means being connected to said generator at a location remote from said liquid trap so that heated liquid heating medium bypasses said liquid trap in passing from said generator to said heat exchanger, said liquid additive overlying the surface of said one leg of said trap.

3. An absorption refrigeration system as defined in claim 1 wherein said liquid additive comprises a material that promotes heat transfer when said system is operating in the cooling mode, said material having a lower specific gravity than said heating medium.

4. An absorption refrigeration system as defined in claim 1 wherein the liquid in said trap comprises liquid heating medium having a layer of the additive overlying the surface of the heating medium in said one leg thereof.

5. An absorption refrigeration system as defined in claim 1 wherein the absorbent comprises an aqueous solution of lithium bromide, the refrigerant comprises water and said additive comprises 2-ethyl-n-hexanol, the liquid in said trap comprising an aqueous solution of lithium bromide having a layer of 2-ethyl-n-hexanol overlying the surface of the solution in said one leg.

6. A method of operating a heating and cooling system wherein said system in the cooling mode comprises a generator for concentrating absorbent solution by boiling the solution and vaporizing refrigerant therefrom, a condenser for condensing refrigerant vapor formed in the generator, an evaporator for providing cooling by evaporating refrigerant condensed in the condenser, and an absorber for absorbing refrigerant vapor formed in the absorber into absorbent solution concentrated in the generator, said system including a refrigerant vapor passage for passing refrigerant vapor from said generator to said condenser; and wherein said system in the heating mode of operation comprises heating passage means for passing a heated heating medium from the generator through a heat exchanger in heat exchange relation with a heating load, and means for returning the heating medium to the generator for reheating therein; wherein the improvement comprises the steps of forming a liquid trap comprising one of the liquids in the system and forming a lower vapor pressure liquid layer over the surface of said one liquid in the trap by passing said one liquid and a liquid additive to said trap when operating the system in the heating mode, said liquid additive having a lower vapor pressure and a lower specific gravity than said one liquid, said liquids gravitationally separating from each other and forming a layer of additive overlying the surface of the one liquid, said layer being formed of sufficient thickness to inhibit vaporization of liquid from the lower layer.

7. A method of operating a heating and cooling system as defined in claim 6 including passing a mixture of liquid heating medium and liquid additive into said region when switching to the heating mode of operation to simultaneously form said liquid trap and said lower vapor pressure layer.

8. A method of operating a heating and cooling system as defined in claim 6 including the step of emulsifying the liquid additive and the liquid heating medium by simultaneously pumping additive and heating medium through a liquid pump, and passing the emulsified additive and heating medium to said region to simultaneously form said liquid trap and said lower vapor pressure layer by gravitational separation thereof.

9. A method of operating a heating and cooling system as defined in claim 6 wherein said additive is a material which improves heat transfer in the cooling mode of operation, and the method includes the step of circulating the additive through the absorber in contact with absorbent solution and refrigerant vapor in the absorber when said system is operating in the cooling mode.